United States Patent
Barave et al.

(10) Patent No.: US 8,300,638 B2
(45) Date of Patent: Oct. 30, 2012

(54) MULTIMODAL MULTILEVEL PRECEDENCE AND PREEMPTION

(75) Inventors: Amit Barave, San Jose, CA (US); Shmuel Shaffer, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 1063 days.

(21) Appl. No.: 11/688,381

(22) Filed: Mar. 20, 2007

(65) Prior Publication Data

US 2008/0232248 A1    Sep. 25, 2008

(51) Int. Cl.
*H04L 12/28* (2006.01)
(52) U.S. Cl. .................. 370/390; 710/316; 379/242
(58) Field of Classification Search .............. 370/390, 370/261, 331, 395.42; 455/518
See application file for complete search history.

(56) References Cited

U.S. PATENT DOCUMENTS

| | | | |
|---|---|---|---|
| 2003/0223431 A1* | 12/2003 | Chavez et al. | 370/395.42 |
| 2007/0091848 A1* | 4/2007 | Karia et al. | 370/331 |
| 2007/0202907 A1* | 8/2007 | Shaffer et al. | 455/518 |
| 2008/0117839 A1* | 5/2008 | Raju et al. | 370/261 |

OTHER PUBLICATIONS

ITU-T_REC-1_.255.3-1990_MLPP.*
"Federal Standard 1037C." wikipedia.org. Wikipedia. Mar. 19, 2007 <http://en.wikipedia.org/wiki/Federal_Standard_1037C>.
"Multilevel precedence and preemption." wikipedia.org. Wikipedia. Mar. 19, 2007. <http://en.wikipedia.org/wiki/Multilevel_precedence_and_preemption>.

* cited by examiner

*Primary Examiner* — Robert Wilson
*Assistant Examiner* — Lionel Preval
(74) *Attorney, Agent, or Firm* — Merchant & Gould

(57) ABSTRACT

A device comprising a network resource controller to preempt at least one multiple-user session over a primary modality of communication according to a precedence-level associated with users of the multiple-user session and to switch the multiple-user session to an alternate modality of communication without disconnection of the multiple-user session.

19 Claims, 5 Drawing Sheets

MULTIMODAL MULTILEVEL PRECEDENCE AND PREEMPTION

FIELD OF THE INVENTION

This invention relates generally to network communications.

BACKGROUND

Most networks have a finite quantity of network resources available to support communication between endpoints. When these network resources are scarce, i.e., currently allocated to support existing calls or sessions, the establishment of new calls or sessions over these networks typically requires that some of the currently allocated network resources become available.

Networks in certain industries, such as the military and emergency services, actively manage their network resources according to a user-based priority scheme, such as multilevel precedence and preemption (MLPP). These networks associate a precedence-level to each network user and re-allocate network resources or preempt existing calls in favor of new calls according to these user-based precedence-levels. For instance, when a higher precedence-level user places a call over a network that does not have adequate resources to support the call, the network will preempt one or more existing calls associated with lower precedence-level users. Although multilevel precedence and preemption helps to ensure that certain users will have priority to network resources, the preemption of existing calls typically results in an abrupt disconnection that often degrades the experience of lower precedence-level users.

DETAILED DESCRIPTION

Overview

In network communications, a device includes a network resource controller to preempt at least one multiple-user session over a primary modality of communication according to a precedence-level associated with users of the multiple-user session and to switch the multiple-user session to an alternate modality of communication without disconnection of the multiple-user session. Embodiments of the present invention will now be described in more detail.

Description

Figure 1:
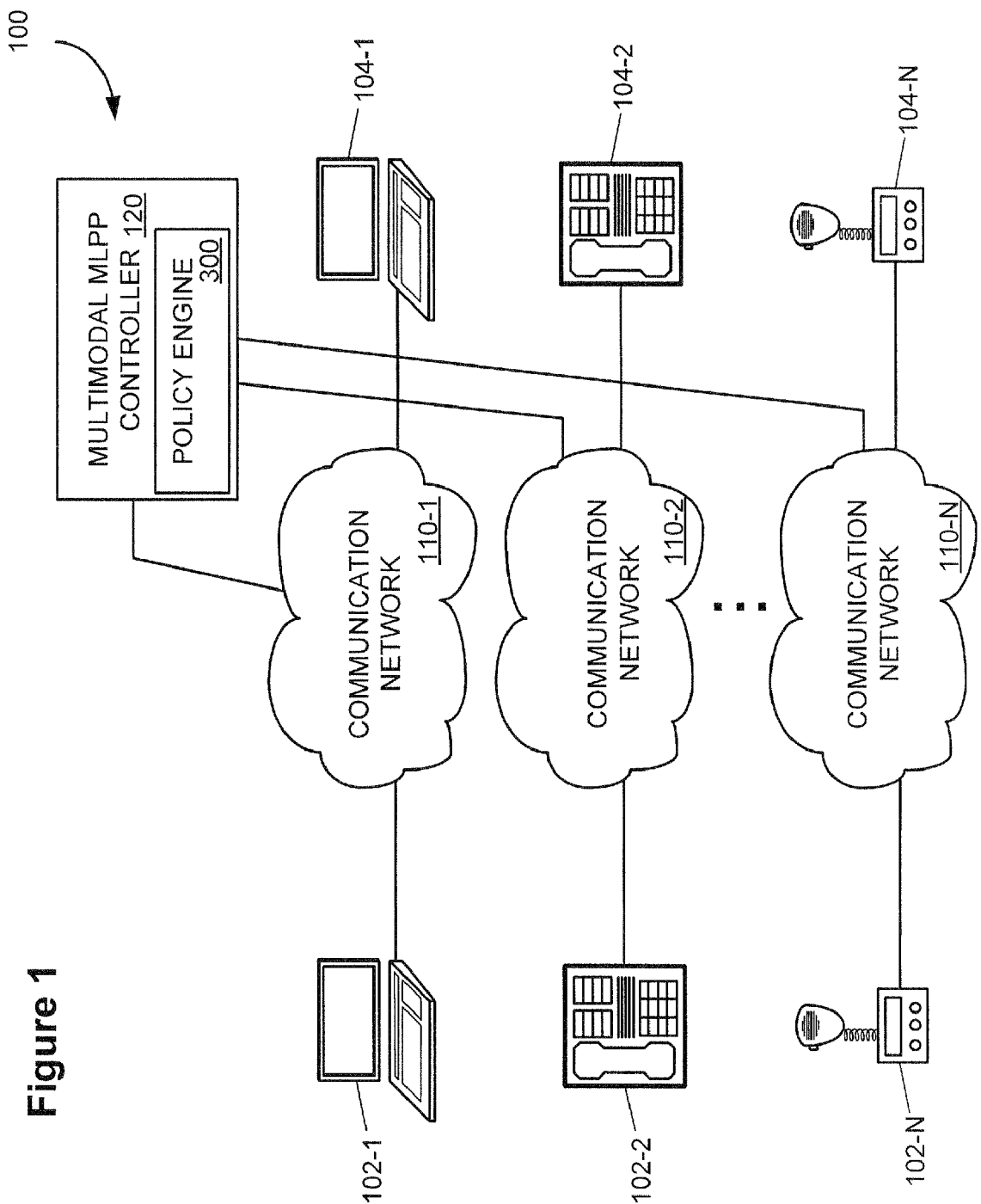
FIG. 1 illustrates an example system implementing multilevel precedence and preemption (MLPP) in a multimedia communication environment.

FIG. 1 illustrates an example system 100 implementing multilevel precedence and preemption (MLPP) in a multimedia communication environment. Referring to FIG. 1, a multimedia system 100 includes a plurality of communication networks 110-1 to 110-N for supporting communication between endpoints 102-1 to 102-N and 104-1 to 104-N, respectively. For instance, endpoints 102-1 and 104-1 may communicate over communication network 110-1 in a multiple user session, and endpoints 102-2 and 104-2 may communicate over communication network 110-2 in a multiple user session, etc. In some embodiments, endpoints 102-1 to 102-N may be associated to at least one user of the multimedia system 100, while endpoints 104-1 to 104-N may be associated to at least another user of the multimedia system 100. Although not shown in FIG. 1, the communication networks 110-1 to 110-N may support additional users and endpoints, and a single endpoint may communicate with multiple communication networks 110-1 to 110-N.

Each of the communication networks 110-1 to 110-N may support one or more modalities of communication, such as audio (voice) communication, audio and visual (voice and video) communication, email, instant messaging, text messaging, radio communications, etc. The endpoints 102-1 to 102-N and 104-1 to 104-N may communicate over the communication networks 110-1 to 110-N, respectively, through any of the modalities supported by both the endpoints 102-1 to 102-N and 104-1 to 104-N and the communication networks 110-1 to 110-N.

The multimedia system 100 includes a multimodal MLPP controller 120 to centrally control the network resources of communication networks 110-1 to 110-N by associating a precedence-level to each user of the multimedia system 100 and reallocating network resources or preempting existing calls in favor of new calls according to these user-based precedence-levels. For instance, when a higher precedence-level user places a call (or initiates a session) over a communication network 110-1 to 110-N that does not have adequate resources to support the call (or session), the multimodal MLPP controller 120 may preempt one or more existing calls (or sessions) associated with lower precedence-level users of the communication network 110-1 to 110-N.

The multimodal MLPP controller 120 includes a policy engine 300 to recognize when the multimodal MLPP controller 120 preempts a call or session and provide one or more alternate modalities for preempted users to continue their communication. For instance, when multimodal MLPP controller 120 preempts a telephone call, the policy engine 300 may identify at least one different modality, such as text messaging, push-to-talk radio transmissions, email etc., for the preempted users to communicate without disconnection. Since the multimodal MLPP controller 120 and a policy engine 300 offer preempted users another form of communication, instead of a traditional disconnection, the process of switching users to a different modality of communication may be referred to as a media substitution or media downgrade. These different modalities may utilize the same communication network associated with the preemption or utilize at least one different communication network in multimedia system 100.

Figure 2:
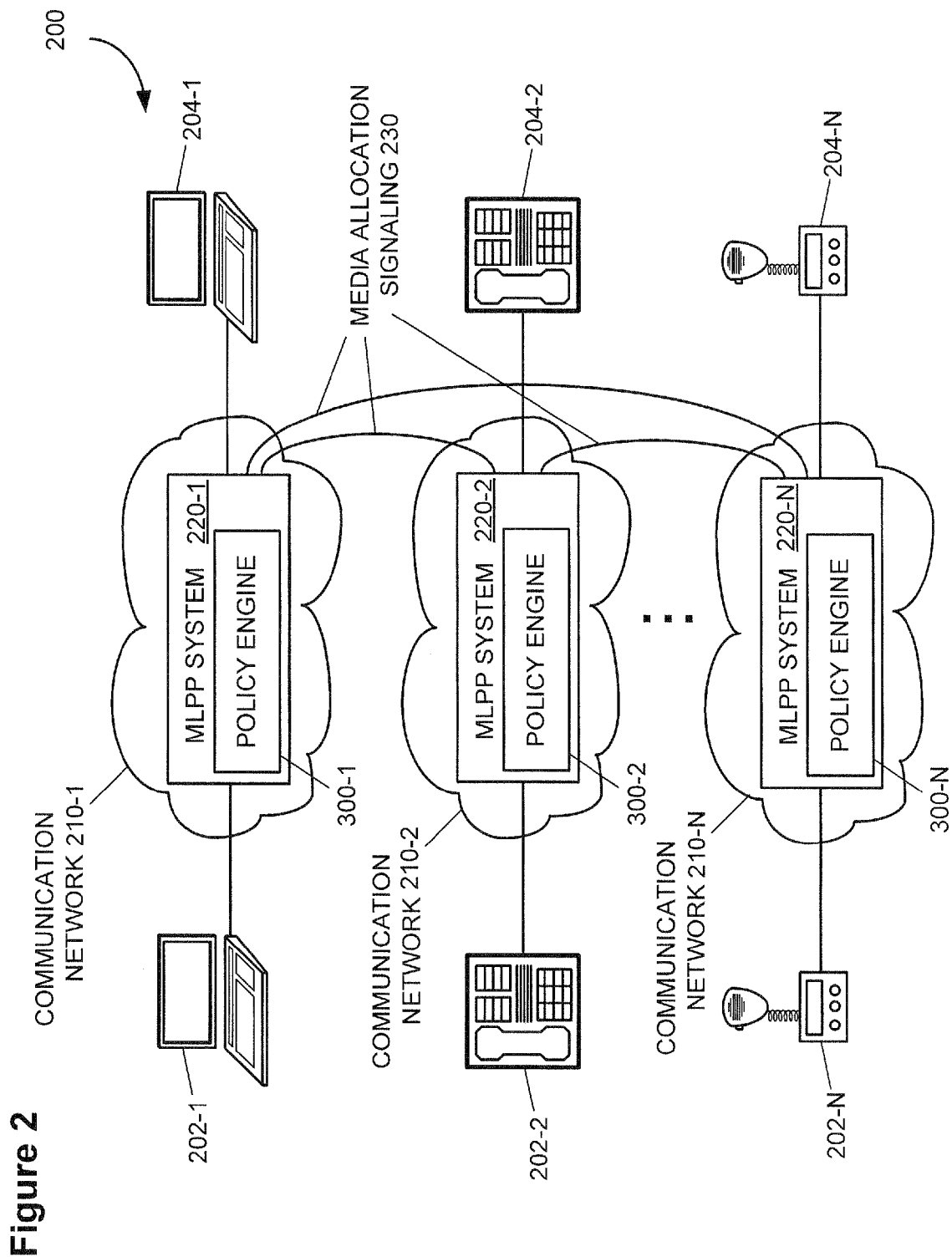
FIG. 2 illustrates another example system implementing multilevel MLPP in a multimedia communication environment.

After a preemption and switch to an alternate communication modality, the multimodal MLPP controller 120 may monitor the availability of network resources on the communication network associated with the preemption and reinitiate the previously preempted call or session over that communication network. This form of communication transfer may be referred to as a media upgrade, as the former preempted users are switched back to their previously preempted modality of communication. The multimodal MLPP controller 120 and policy engine 300 may also perform media upgrades after an attempt by low-precedence-level users to establish a call or a session is rejected due to a lack of adequate network resources to support the new call or session. Although FIG. 1 shows multiple networks 110-1 to 110-N, in some embodiments these networks may be in one network, for example, one IP network which can support multiple communication modalities. Similarly, even though the endpoints 102 and 104 are shown as separate discrete endpoints in FIG. 1, in some embodiments a multimedia endpoint may have the ability to communicate with a variety of multimedia modalities. Embodiments of this media switching will be described below in greater detail, FIG. 2 illustrates another example system 200 implementing MLPP in a multimedia communication environment. Referring to FIG. 2, a multimedia system 200 includes a plurality of communication networks 210-1 to 210-N for supporting communication between endpoints 202-1 to 202-N and 204-1 to 204-N, respectively. For instance, endpoints 202-1 and 204-1 may communicate over communication network 210-1 in a multiple user session, and endpoints 202-2 and 204-2 may communicate over communication network 210-2 in a multiple user session, etc. In some embodiments, endpoints 202-1 to 202-N may be associated to at least one user of the multimedia system 200, while endpoints 204-1 to 204-N may be associated to at least another user of the multimedia system 200. Although not shown in FIG. 2, the communication networks 210-1 to 210-N may support additional users and endpoints, and a single endpoint may communicate with multiple communication networks 210-1 to 210-N.

Each of the communication networks 210-1 to 210-N includes an MLPP system 220-1 to 220-N, respectively, that may support one or more modalities of communication, such as audio (voice) communication, audio and visual (voice and video) communication, email, instant messaging, text messaging, radio communications, etc. The endpoints 202-1 to 202-N and 204-1 to 204-N may communicate over the communication networks 210-1 to 210-N, respectively, through any of the modalities supported by both the endpoints 202-1 to 202-N and 204-1 to 204-N and the MLPP systems 220-1 to 220-N.

The MLPP systems 220-1 to 220-N provide distributed control over the network resources of communication networks 210-1 to 210-N. Each MLPP system 220-1 to 220-N may associate a precedence-level to each user of their respective communication networks 210-1 to 210-N and re-allocate network resources or preempt existing calls in favor of new calls according to these user-based precedence-levels. For instance, when a higher precedence-level user places a call (or initiates a session) over communication network 210-1 that does not have adequate resources to support the call (or session), the MLPP system 220-1 will preempt one or more existing calls (or sessions) associated with lower precedence-level users of the communication network 210-1.

Each MLPP system 220-1 to 220-N includes a policy engine 300-1 to 300-N, respectively, to indicate when their corresponding MLPP system 220-1 to 220-N preempts a call or session and to provide one or more alternate modalities for preempted users to continue their communication. The MLPP systems 220-1 to 220-N may communicate with each other through media allocation signaling 230 to identify the alternate modalities for the preempted users and facilitate modality switching between different communication networks 210-1 to 210-N. For instance, when MLPP system 220-1 preempts a telephone call, the MLPP system 220-1 may communicate with one or more of the MLPP systems 220-2 to 220-N to identify at least one different modality on communication networks 210-2 to 220-N, such as text messaging, push-to-talk radio transmissions, email etc., for the preempted users to communicate without disconnection and to facilitate modality switching with an identified communication network 210-1 to 210-N. In some embodiments, the MLPP system 220-1 may identify at least one different modality on communication network 210-1 without having to communicate to the other MLPP systems 220-2 to 220-N.

After a preemption and switch to an alternate communication modality, one or more of the policy engines, e.g., policy engine 300-1, may monitor the availability of network resources on communication network 210-1 and alert the MLPP system 220-2 to 220-N associated with the transferred call or session that the previously preempted call or session over communication network 210-1 may be resumed. The MLPP systems 220-1 to 220-N may also perform these media upgrades after an attempt by low-precedence-level users to establish a call or a session over their corresponding communication network 210-1 to 210-N, but were rejected due to a lack of adequate network resources to support the new call or session. Embodiments of media switching will be described below in greater detail.

Figure 3:
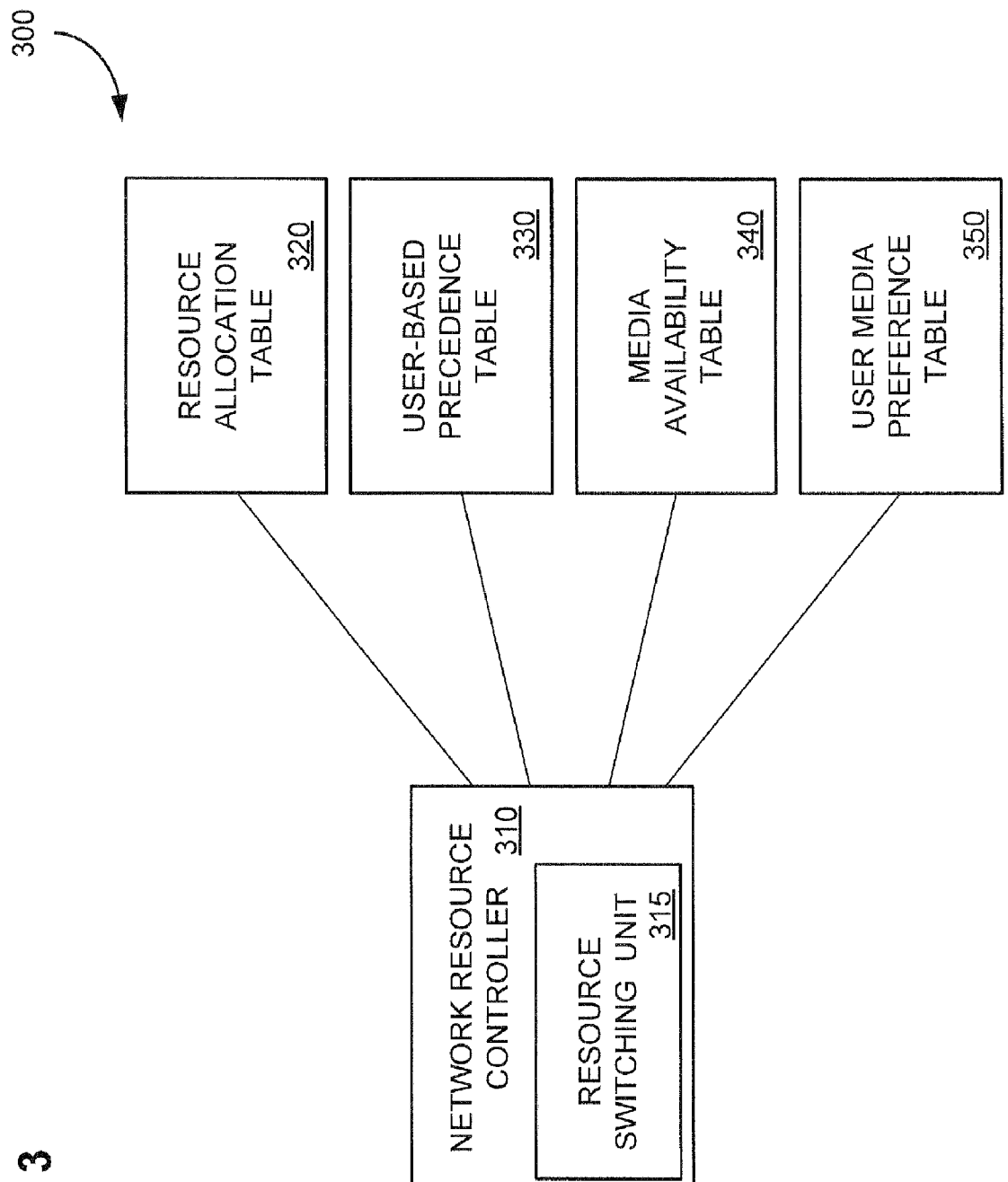
FIG. 3 illustrates example embodiments of a policy engine shown in FIGS. 1 and 2.

FIG. 3 illustrates example embodiments of a policy engine 300 shown in FIGS. 1 and 2. Referring to FIG. 3, the policy engine 300 includes a network resource controller 310 to control resources associated with one or more communication networks. For instance, when the policy engine 300 is included in multimodal MLPP controller 120, the network resource controller 310 may allocate resources for communication networks 110-1 to 110-N. When the policy engine 300 is included in one of the MLPP system 220-1 to 220-N, the network resource controller 310 may allocate resources for the communication network 210-1 to 210-N associated with the MLPP system 220-1 to 220-N and have the ability to communicate with other MLPP systems in the multimedia system 200. The network resource controller 310 includes a resource switching unit 315 to preempt calls or sessions and switch the preempted calls or sessions to an alternative modality of communication.

The policy engine 300 may maintain a resource allocation table 320 that identifies the allocation of network resources for one or more of the communication networks. The network resource controller 310 may access the resource allocation table 320 to determine whether there are adequate network resources to establish a new call or session over a communication network. When there are not adequate resources available to support the new session, the network resource controller 310 may preempt an existing call or session according to a user-based precedence-level, and/or identify alternative communication networks that have adequate network resources for the users.

The policy engine 300 may maintain a user-based precedence table 330 that indicates a predetermined precedence-level of each user of the associated communication network. When the user-based precedence table 330 is located within the multimodal MLPP controller 120, the user-based precedence table 330 may include precedence-levels associated with each user of the multimedia system 100. When the user-based precedence table 330 is located within the one of the MLPP systems 220-1 to 220-N, the user-based precedence table 330 may include precedence-levels associated with each user of the corresponding communications network 210-1 to 210-N, multiple communications network 210-1 to 210-N, or the multimedia system 200. The network resource controller 310 may access the user-based precedence table 330 to determine a user-based precedence-level that may be used to preempt an existing call or session or reject an attempt to establish a new call or session.

The policy engine 300 may maintain a media modality availability table 340 that provides a user-based indicator of the media modality available to each user associated with one or more communication network. The media modality availability table 340 may identify the type of endpoints available to a user or the modalities of communication available to the user, or both. For instance, the media modality availability table 340 may indicate that a user may communicate with audio (voice) communication and text messaging, or provide an identification of the types of endpoints that support the audio communication and text messaging, such as a telephone, cellular phone, computer system, radio. etc.

The network resource controller 310 may access the media availability table 340 to determine the alternate modalities of communication available to a user in the event of call (or session) preemption. The media availability table 340 may be populated with predetermined endpoints and modalities, or may be dynamically updated according to the modalities or endpoints currently available to the user. For instance, the policy engine 300 may include presence detection functionality to dynamically determine endpoints available to a user by detecting the use of an endpoint by the user, and thus add that endpoint or modality of communication associated with that endpoint to the media availability table 340. In one example, a user may be typing on a keyboard of a computer system, while on a telephone call, thus alerting the policy engine 300 that the user is available to receive email, instant messages, text messages, etc., via the computer system as well as any additional modalities supported by the endpoint associated with the telephone call.

The policy engine 300 may maintain a user media preference table 350 that provides media preferences for users of the multimedia system. The user media preference table 350 may include a list of media preferences for each user, such as video conferencing versus a voice telephone call, or a push-to-talk radio versus an instant messaging session, etc.

The network resource controller 310 may access the user media preference table 350 to determine a media preference for users in the event a call or session is preempted and there are multiple modalities of communication available to each user associated with a preempted call or session.

The network resource controller 310 may include user experience functionality (not shown) that attempts to maintain the effectiveness of the communication the user was conducting. For instance, the network resource controller 310 may provide users a choice of alternate modalities, when applicable, prior to media switching (upgrade or downgrade). The network resource controller 310 may also attempt to switch users to a modality of communication that they are unlikely to be preempted from in the future. For instance, when performing a media upgrade or downgrade, the network resource controller 310 may consider a resource allocation of a network, and in some embodiments in conjunction with the precedence-level of the users, to determine whether it is likely that the user, once switched, will be preempted. In some embodiments, the network resource controller 310 may determine whether it is likely that a switched user will be preempted with threshold levels of resource allocation that may vary according to the precedence-level of the users. In other words, the network resource controller 310 would attempt to eliminate a constant media upgrade and media downgrade fluctuation by determining when media switching will be subject to a subsequent preemption.

Figure 4:
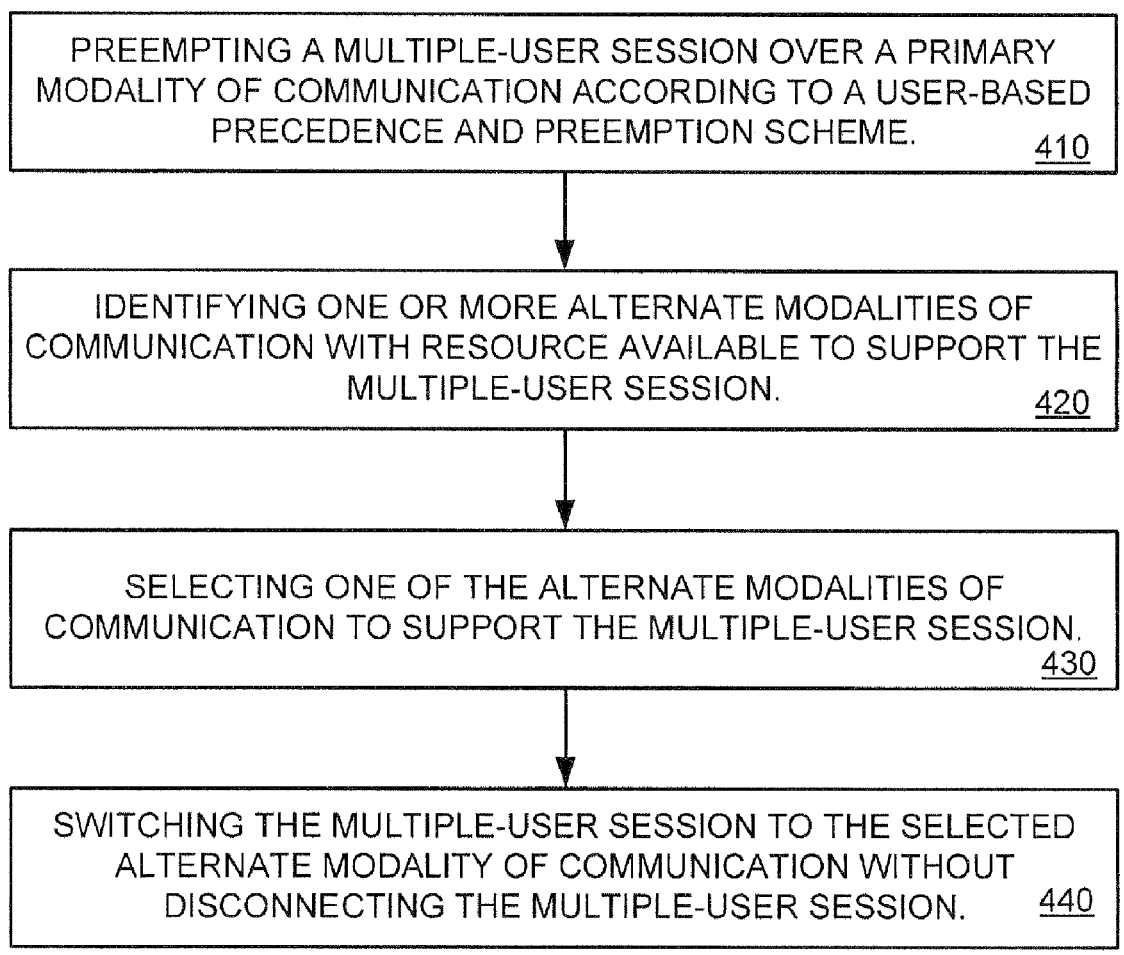
FIGS. 4 and 5 show example methods for implementing MLPP, in multimedia communication environment.
Figure 5:
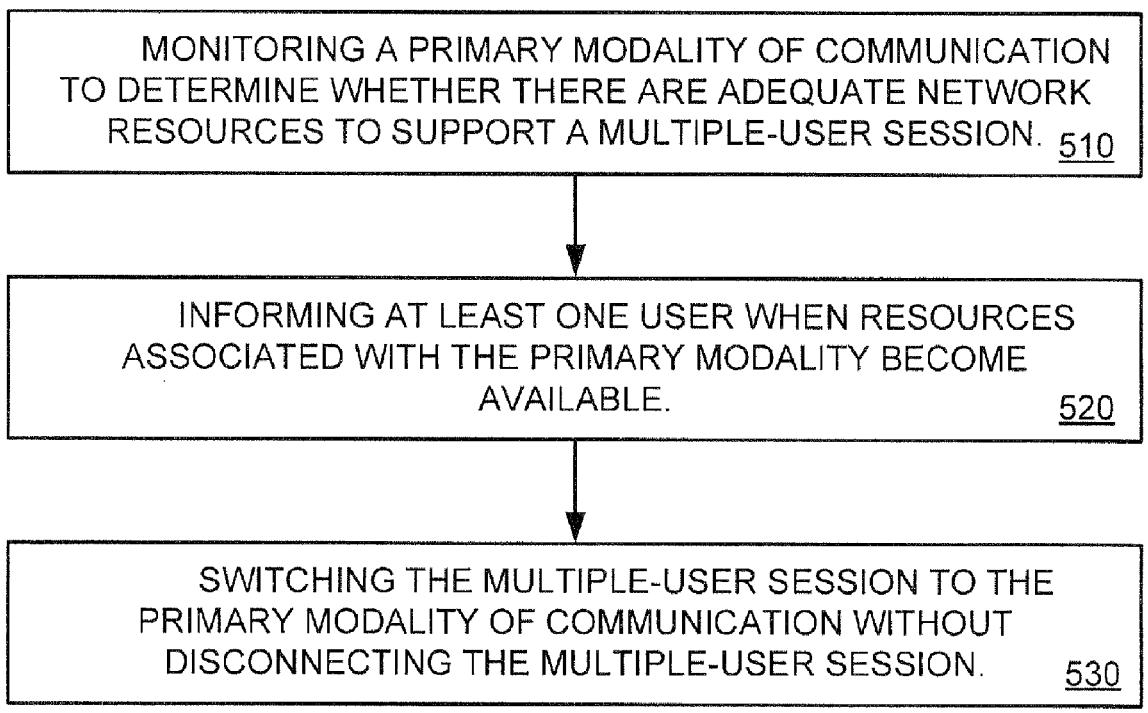

FIGS. 4 and 5 show example methods for implementing MLPP in a multimedia communication environment. Referring to FIG. 4, in a block 410, at least one controller preempts a multiple-user session over a primary modality of communication according to a user-based precedence and preemption scheme, such as MLPP. The preemption may be of an existing call or session, or of a new call or session attempted to be established over the primary modality of communication.

In a block 420, the controller identifies one or more alternate modalities of communication with resources available to support the multiple-user session. The controller may identify these alternate modalities of communication by identifying at least one communication network that has network resources available to support the multiple-user session, and determining endpoints available to the users associated with the multiple-user session have the capability to support communication over the identified communication network. As described above, in some embodiments, the controller may determine the endpoints available to the users through presence detection functionality. The controller may also identify these alternate modalities of communication according to their security features. For instance, when the primary modality has a certain security level, the controller can limit the alternate modalities to those with security greater than or equal to the primary modality.

When implemented in a distributed system, the controller may communicate with one or more other controllers to identify whether a communication network has network resources available to support the multiple-user session, and/or to determine endpoints available to the users associated with the multiple-user session have the capability to support communication over the identified communication network.

In block 430, the controller selects one of the alternate modalities of communication to support the multiple-user session. The controller may select the alternate modality of communication according to a user-based preference table 350 that identifies user modality preferences. In some embodiments, the controller may provide one or more of the identified alternate modalities of communication to at least one of the users and receive an indication of a preferred modality. The controller may then select the alternate modality of communication responsive to this user generated indication.

In block 440, the controller switches the multiple-user session to the selected alternate modality of communication without disconnecting the multiple-user session. The controller may switch modalities from a centralized location or through a distributed system where multiple controllers cooperate to switch modalities. When the alternate modality of communication would also identify the presence of the user to others not associated with multiple-user group, such as in an instant messaging session, the controller may avail the user to this alternate modality of communication in a limited fashion, e.g., by limiting the ability of those not associated with multiple-user group from detecting user presence.

Referring to FIG. 5, in a block 510, at least one controller monitors a primary modality of communication to determine whether there are adequate network resources to Support a multiple-user session. This multiple-user session may be a call or session previously preempted from the primary modality, or a call or session that attempted to establish over the primary modality, but the network did not have available resource to support the multiple-user session or a requisite precedence-level to reallocate network resources, i.e., preempt at least another call or session. When implemented in a distributed system, the controller may communicate with one or more other controllers to identify whether a communication network has network resources available to support the multiple-user session.

In a block 520, the controller optionally informs at least one user when resources associated with the primary modality become available. The user may provide an indication of a desired switch to the primary modality of communication. In some embodiments, each user of the multiple-user session may have to provide the indication in order to the controller to switch to the primary modality of communication.

In block 530, the controller switches the multiple-user session to the primary modality of communication without disconnecting the multiple-user session. This switching may be performed automatically when adequate network resources are available or responsive to the indication of a desired switch from one or more of the users. The controller may switch modalities from a centralized location, or through a distributed system where multiple controllers cooperate to switch modalities. When the primary modality of communication would also identify the presence of the user to others not associated with multiple-user group, such as in an instant messaging session, the controller may avail the user to this primary modality of communication in a limited fashion, e.g., by limiting the ability of those not associated with multiple-user group from detecting user presence. In one example embodiment the system notifies the user of the imminent change and of the alternative available communication modality.

One of skill in the art will recognize that the concepts taught herein can be tailored to a particular application in many other advantageous ways. In particular, those skilled in the art will recognize that the illustrated embodiments are but one of many alternative implementations that will become apparent upon reading this disclosure.

The preceding embodiments are exemplary. Although the specification may refer to "an", "one", "another", or "some" embodiment(s) in several locations, this does not necessarily mean that each such reference is to the same embodiment(s), or that the feature only applies to a single embodiment.

The invention claimed is:

1. A device comprising:
a network resource controller to preempt at least one multiple-user session over a primary modality of communication according to a precedence-level associated with users of the multiple-user session, where the network resource controller, responsive to the preemption of the multi-user session, is configured to switch the multiple-user session to an alternate modality of communication without disconnection of the multiple-user session, where the network resource controller is configured to monitor an availability of network resources capable of supporting multiple-user sessions over the primary modality of communication after switching the multiple-user session to the alternate modality of communication, and where the network resource controller is configured to automatically switch the multiple-user session back to the primary modality of communication from the alternate modality of communication when the network resource controller determines the network resources are available to support the multiple-user session responsive to the monitored availability of the network resources.

2. The device of claim 1 where the network resource controller is configured to identify multiple modalities of communication available to the users of the multiple-user session, and to switch the multiple-user session to one of the identified modalities of communication.

3. The device of claim 2 where the network resource controller is configured to maintain a preference table identifying a list of modality preferences associated with the users of the multiple-user session and to select the alternate modality of communication from the list of modality preferences.

4. The device of claim 1 where the network resource controller is configured to communicate with other resource controllers associated with different communication networks to determine an availability of resources associated with the different communication networks, and to facilitate switching the multiple-user session to one of the different communication networks responsive to the communication with the other resource controllers.

5. The device of claim 1 where the network resource controller is configured to identify communication endpoint devices available to the users of the multiple-user session and to switch modalities of communication according to at least one of the available communication endpoint devices.

6. The device of claim 5 where the network resource controller is configured to detect a presence of the user on the communication endpoint devices to identify the communication endpoint devices available to the users of the multiple-user session.

7. The device of claim 1 where the network resource controller is configured to switch the multiple-user session back to the primary modality of communication from the alternate modality of communication based on the precedence-level associated with users of the multiple-user session.

8. A method comprising:
determining to switch a multiple-user session from a first modality of communication to a second modality of communication having available network resources to support the multiple-user session;
preempting the multiple-user session from communicating over the first modality of communication responsive to the determining;
switching the multiple-user session to the second modality of communication responsive to the preempting;
monitoring an availability of network resources capable of supporting multiple-user sessions over the first modality of communication after switching the multiple-user session to the second modality of communication;
automatically switching the multiple-user session back to the first modality of communication from the second modality of communication when, responsive to the monitored availability of the network resources, there are adequate network resources associated with the first modality of communication available to support the multiple-user session.

9. The method of claim 8 includes switching the multiple-user session to the second modality of communication when there are adequate network resources associated with the second modality of communication available to support the multiple-user session and based on a precedence-level associated with users of the multiple-user session.

10. The method of claim 8 includes
determining multiple modalities of communication that are available to users of the multiple-user session;
identifying one or more modalities of communication from the multiple modalities of communication capable of supporting the multiple-user session; and
switching the multiple-user session to one of the identified modalities of communication.

11. The method of claim 10 includes
identifying user-based preferences corresponding to the identified modalities of communication;
selecting one of the identified modalities of communication according to the user-based preferences; and
switching the multiple-user session to the modality of communication selected according to the user-based preferences.

12. The method of claim 8 includes
determining one or more endpoint devices that are available to users of the multiple-user session;

identifying one or more modalities of communication available to users of the multiple-user session from the determined endpoint devices; and switching the multiple-user session to one of the identified modalities of communication.

13. A system comprising:

a primary controller to preempt a multiple-user session over a primary modality of communication according to a precedence-level associated with users of the multiple-user session; and a secondary controller to support the multiple-user session with an alternate modality of communication without disconnection of the multiple-user session, where the primary controller is configured to monitor an availability of network resources capable of supporting multiple-user sessions over the primary modality of communication after the switch of the multiple-user session to the alternate modality of communication, and where the primary controller is configured to switch the multiple-user session back to the primary modality of communication from the alternate modality of communication when the primary controller determines the network resources are available to support the multiple-user session responsive to the monitored availability of the network resources.

14. The system of claim 13 where the primary controller is configured to identify multiple alternate modalities of communication available to the users of the multiple-user session, and to switch the multiple-user session according to one of the identified alternate modalities of communication.

15. The system of claim 14 where the primary controller is configured to maintain a preference table identifying a list of modality preference for the users of the multiple-user session and to select one of the identified modalities of communication as the alternate modality of communication.

16. The system of claim 13 where the primary controller is configured to communicate with the secondary controller to identify resources available to support the alternate modality of communication, and to facilitate switching the multiple-user session to the alternate modality of communication responsive to the communication between the primary and secondary controllers.

17. The system of claim 13 where the primary controller is configured to identify one or more communication endpoint devices available to the users of the multiple-user session, where the multiple-user session is switched to the alternate modality of communication according to at least one of the identified communication endpoint devices.

18. The system of claim 17 where the primary controller is configured to detect a presence of the user on the communication endpoint devices to identify the communication endpoint devices that are available to the users of the multiple-user session.

19. The system of claim 13 where the primary controller is configured to switch the multiple-user session back to the primary modality of communication from the alternate modality of communication responsive to the precedence-level associated with users of the multiple-user session.

* * * * *